Patented Sept. 16, 1941

2,255,752

UNITED STATES PATENT OFFICE 2,255,752

PROCESS FOR PRODUCING TETRACHLORETHYLENE

Georg Basel and Erich Schaeffer, Burghausen, Upper Bavaria, Germany, assignors to Dr. Alexander Wacker Gesellschaft für Elektrochemische Industrie G. m. b. H., Munich, Bavaria, Germany, a corporation No Drawing. Application February 19, 1938, Serial No. 191,575. In Germany June 19, 1937

9 Claims. (Cl. 260—654)

This invention relates to the production of tetrachlorethylene and has for its object to provide a simple and efficient process for this purpose.

The invention resides in the production of tetrachlorethylene from acetylene and chlorine. The process consists essentially in passing a mixture of these two gases in about the ratio of 1:3 mols in contact with hot surfaces in the presence of a gas which does not enter into reaction, e. g. nitrogen or hydrochloric acid. The passage of the gas mixture through the catalyst chamber is so regulated that neither acetylene nor chlorine issues from the chamber, but substantially only tetrachlorethylene vapor and hydrochloric acid emerge. One part of the latter is always again added to the chlorine-acetylene gas mixture entering the reaction chamber in order to dilute the mixture and to prevent the formation of soot or undesirable by-products through heating of the contact surfaces to a high temperature.

As a rule about three to eight times the volume of diluting gas, e. g. hydrochloric acid gas, is added to the acetylene-chlorine gas mixture. The adjustment of the reaction temperature may be controlled also by a corresponding addition of diluting gas, and also by cooling the gas mixture or the individual components thereof which enter the reaction chamber. In order to obtain tetrachlorethylene from the reaction gas product the latter is cooled after it leaves the reaction chamber, so that the tetrachlorethylene is condensed. However, the tetrachlorethylene may also be separated in other ways, as through adsorption and the like. The conversion occurs practically quantitatively, with the generation of tetrachlorethylene as well as hydrochloric acid of great purity. The application of overpressure renders possible a reduction in the size of the reaction chamber, but in general such procedure requires more expensive equipment. With the use of a vacuum there would be danger of oxygen entering at leaky points, which might occasion an explosion.

The reaction temperature is determined in accordance with the dilution of the reaction gas with hydrochloric acid and the mixture; in general a temperature of 300 to 400° C. has been found suitable. Dense bodies, e. g. china or glass shads are suitable as contact surfaces, but porous contacts, particularly highly active ones, such as animal charcoal, charcoal, silica gel and the like are in general preferred. They are suitably provided or impregnated with substances which promote the absorption of chlorine and the splitting of hydrochloric acid in order to increase the efficiency and duration of the contact surfaces; for example, such substances as chlorides of bivalent metals, e. g. copper chlorid and the like, are suitable for this purpose.

Example 1

The catalyst chamber of a volume of 500 cubic cms. is filled with activated carbon, and a temperature of 300–400° C. is maintained. A gas mixture composed of 30 liters of chlorine, 10 liters of acetylene and 120–150 liters of nitrogen is passed through said catalyst chamber in the space of one hour. Since all the acetylene becomes converted with the chlorine, a mixture consisting substantially of tetrachlorethylene vapor, hydrochloric acid and nitrogen leaves the reaction chamber. The tetrachlorethylene may be readily separated by cooling. The hydrochloric acid is removed from the waste gas, so that the nitrogen can again be added to the mixture of chlorine-acetylene gas required for the conversion. If the gas entering the reaction chamber is first cooled, the nitrogen addition may be reduced. The yield of tetrachlorethylene is 80% and higher.

Example 2

The catalyst chamber is filled to a volume of 2.5 liters with a catalyst consisting of activated carbon which is impregnated with barium chloride. The gas mixture, passed through the catalyst chamber at a temperature of 300–400° C., consists of

| | Liters |
|---|---|
| Acetylene | 35– 40 |
| Chlorine | 100–120 |
| Hydrochloric acid gas _____about__ | 1000 |

A mixture of tetrachlorethylene vapor and hydrochloric acid gas emerges from the catalyst chamber. By cooling or adsorption by means of activated carbon or silica gel the tetrachlorethylene may be separated. Upon cooling, a part of the hydrochloric acid gas may again be suitably added to the chlorine-acetylene gas mixture required for the conversion. The output in tetrachlorethylene amounts to 90% and more. By using elevated pressures a somewhat smaller catalyst space is sufficient.

It will be evident that various changes may be made in the details of the foregoing process without departing from the scope and spirit of the invention as defined in the appended claims.

The invention claimed is:

1. Process for producing tetrachlorethylene which comprises passing a mixture of acetylene and chlorine over contact surfaces at a temperature of 300–400° C. in the presence of a gas which is inert to the reaction and in the absence of water.

2. Process for producing tetrachlorethylene which comprises passing a mixture of acetylene and chlorine in the ratio of about 1:3 mols over contact surfaces heated to a temperature of 300–400° C. in the presence of a gaseous diluent which is inert to the reaction and in the absence of water.

3. Process for producing tetrachlorethylene which comprises passing a mixture of acetylene and chlorine over contact surfaces heated to a temperature of 300–400° C. in the presence of hydrochloric acid gas and in the absence of water.

4. Process for producing tetrachlorethylene which comprises passing a mixture of acetylene and chlorine over porous contact surfaces heated to a temperature of 300–400° C. in the presence of a gaseous diluent which is inert to the reaction and in the absence of water.

5. Process for producing tetrachlorethylene which comprises passing a mixture of acetylene and chlorine in the ratio of about 1:3 mols over porous contact surfaces heated to a temperature of 300–400° C. in the presence of a gaseous diluent which is inert to the reaction and in the absence of water.

6. Process according to claim 1 in which the contact surfaces are treated with a chloride of a bivalent metal.

7. Process according to claim 3 in which the contact surfaces are treated with a chloride of a bivalent metal.

8. Process according to claim 4 in which the contact surfaces are treated with a chloride of a bivalent metal.

9. Process according to claim 5 in which the contact surfaces are treated with a chloride of a bivalent metal.

GEORG BASEL.
ERICH SCHAEFFER.